(12) United States Patent
Stedman et al.

(10) Patent No.: US 7,251,738 B2
(45) Date of Patent: Jul. 31, 2007

(54) METHOD OF REMOTELY CONTROLLING POWER TO AN INFORMATION HANDLING SYSTEM VIA A PERIPHERAL BUS AFTER A LOSS OF POWER

(75) Inventors: Roy W. Stedman, Austin, TX (US); Todd Martin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 420 days.

(21) Appl. No.: 10/719,732

(22) Filed: Nov. 21, 2003

(65) Prior Publication Data

US 2005/0114719 A1 May 26, 2005

(51) Int. Cl.
*G06F 1/00* (2006.01)

(52) U.S. Cl. .................. 713/324; 713/320; 713/300

(58) Field of Classification Search .............. 713/300, 713/310, 323, 324, 320
See application file for complete search history.

(56) References Cited

U.S. PATENT DOCUMENTS

| | | | | |
|---|---|---|---|---|
| 5,802,305 A * | 9/1998 | McKaughan et al. | ....... | 709/227 |
| 5,880,721 A * | 3/1999 | Yen | ............. | 725/81 |
| 5,903,765 A * | 5/1999 | White et al. | ............. | 713/310 |
| 5,978,923 A * | 11/1999 | Kou | ............. | 713/323 |
| 6,052,793 A * | 4/2000 | Mermelstein | ............. | 713/340 |
| 6,453,423 B1 * | 9/2002 | Loison | ............. | 713/310 |
| 6,546,472 B2 | 4/2003 | Atkinson et al. | | |
| 6,553,400 B1 | 4/2003 | Fukuda | | |
| 6,591,368 B1 * | 7/2003 | Ryu | ............. | 713/323 |
| 6,618,813 B1 * | 9/2003 | Hsu et al. | ............. | 713/323 |
| 6,802,010 B1 * | 10/2004 | Kim et al. | ............. | 726/20 |
| 2001/0027530 A1 * | 10/2001 | Yen et al. | ............. | 713/300 |
| 2002/0023233 A1 * | 2/2002 | O'Meany | ............. | 713/300 |
| 2003/0084210 A1 * | 5/2003 | Wu et al. | ............. | 710/9 |
| 2003/0233519 A1 * | 12/2003 | Chien et al. | ............. | 711/115 |
| 2004/0230790 A1 * | 11/2004 | Zhang et al. | ............. | 713/2 |
| 2004/0243860 A1 * | 12/2004 | Green et al. | ............. | 713/300 |
| 2006/0117127 A1 * | 6/2006 | Milan et al. | ............. | 710/313 |

OTHER PUBLICATIONS

Karagiannis, Konstantinos, "HP Compaq Tablet PC TC 1000", PC Magazine, Dec. 3, 2002.
"Intel Low Power Technologies for Mobile PCs", www.intel.com/mobile/resources/downloads/pdf/LowPower.PDF.
"Application Power Management for Mobility", Intel Corporation, Mar. 20, 2002.

(Continued)

*Primary Examiner*—Chun Cao
*Assistant Examiner*—Malcolm Cribbs
(74) *Attorney, Agent, or Firm*—Haynes and Boone, LLP

(57) ABSTRACT

An information handling system (IHS) is provided which is controlled by a remote control that sends commands to a receiver in the IHS. The IHS has the ability to recover from a loss of power that occurs when the IHS has entered a reduced power state. After power loss and power return to the IHS, the IHS will still respond to a power on resume command from the remote control. The IHS is configured such that when power is returned to the IHS, a sufficient portion of the IHS is powered so that the receiver is enabled to receive a power on or resume command from the remote control and the IHS can act on that command.

26 Claims, 3 Drawing Sheets

OTHER PUBLICATIONS

"Is Wacom slowing down tablet innovation?", Tabula PC, Sep. 22, 2003.

Versa LitePad / Tablet PC User's Guide, NEC Solutions America, Jan. 2003.

Bennett, Jonathan, "ViewSonic Tablet PC V1100", ZDNet's, Nov. 7, 2002.

"Windows Power Management: Instant PC Availability and Energy Savings", Microsoft, Dec. 4, 2001.

Wilcox, Joe, "Media Center PCs in the spotlight", CNET News.com, Oct. 28, 2002.

Fried, et al., "Dell, Sony to launch Media Center PCs", CNET News.com, Sep. 4, 2003.

* cited by examiner

100

US 7,251,738 B2

METHOD OF REMOTELY CONTROLLING POWER TO AN INFORMATION HANDLING SYSTEM VIA A PERIPHERAL BUS AFTER A LOSS OF POWER

BACKGROUND

The disclosures herein relate generally to information handling systems (IHS's) and more particularly to the recovery of IHS's from a reduced power mode while being remotely controlled.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHS's can experience difficulties in powering back up after AC power is lost and then returns. Basic Input Output System (BIOS) software addresses this problem through an AC recovery feature. The AC recovery feature gives the user a level of control over the state to which the IHS will return when power is restored. For example, the user can set the BIOS such that 1) the IHS will always turn on when power is restored, or 2) the IHS will always be off when power is restored.

IHS's can be equipped with remote controls having functions such as power on/off, volume control, audio balance and other controls desirable for multimedia users. Such a remote control allows the user to conveniently control the IHS from some distance away. In one version, the remote control transmits an infrared (IR) signal to an IR receiver connected to a peripheral bus of the IHS. Pressing the on/off button of such a remote control can place the IHS in a reduced power suspend mode. However, if the IHS loses power while in suspend mode, the remote control can no longer wake up the IHS. This occurs because the power to the peripheral bus on which the IR receiver is connected is no longer present, provided the system is not set to restart on AC loss and the shutdown was caused by AC loss and not a user-shutdown. Thus, the IR receiver is inactive and can not detect a turn-on or resume command from the remote control.

One hardware solution for solving this problem is to add a separate microcontroller to work in conjunction with the IR receiver of the IHS. The IHS is configured such that power is always provided to the microcontroller and its IR receiver. Thus, whenever the IHS is supplied power, the microcontroller and its IR receiver stand ready to receive and process commands from the remote control. Unfortunately, such a hardware-based solution adds significant cost to the IHS. Also, IHS basic input output systems (BIOS) are known which include a feature to resume operation from power loss enough to enable a wake-on-LAN (WOL) function. However, this does not solve the problem at hand.

What is needed is a way to enable an IHS to respond to commands from a remote control after power has been lost and restored, or turned off by a user, without resorting to expensive additional hardware.

SUMMARY

Accordingly, in one embodiment, a method is disclosed for operating an information handling system (IHS) including a remote control and a receiver responsive to the remote control. The method includes receiving, by the receiver of the IHS, a command from the remote control instructing the IHS to enter a reduced power mode. The method also includes entering the reduced power mode, by the IHS, in response to the command. The method further includes supplying power to a sufficient portion of the IHS to enable the IHS to respond to commands from the remote control when it is found that power to the IHS has been lost and is returned.

In another embodiment, an information handling system (IHS) is disclosed which includes a processor and a memory coupled to the processor. The IHS further includes glue logic, coupled to the processor, for enabling devices to be coupled to the processor. The IHS still further includes a receiver, coupled to the glue logic, for receiving commands and a remote control for sending commands to the receiver. The method also includes nonvolatile storage, coupled to the glue logic, including control software for causing the IHS to enter a reduced power mode in response to the receiver receiving a command from the remote control and, upon loss of power by the IHS and return of power to the IHS, instructing that power be supplied to a sufficient portion of the IHS to enable the IHS to respond to commands from the remote control.

A principal advantage of the embodiments disclosed herein is the IHS can still respond to power on or resume commands from the remote control even though power was lost while the IHS was in a reduced power mode and power is now returned.

DETAILED DESCRIPTION

Figure 1:
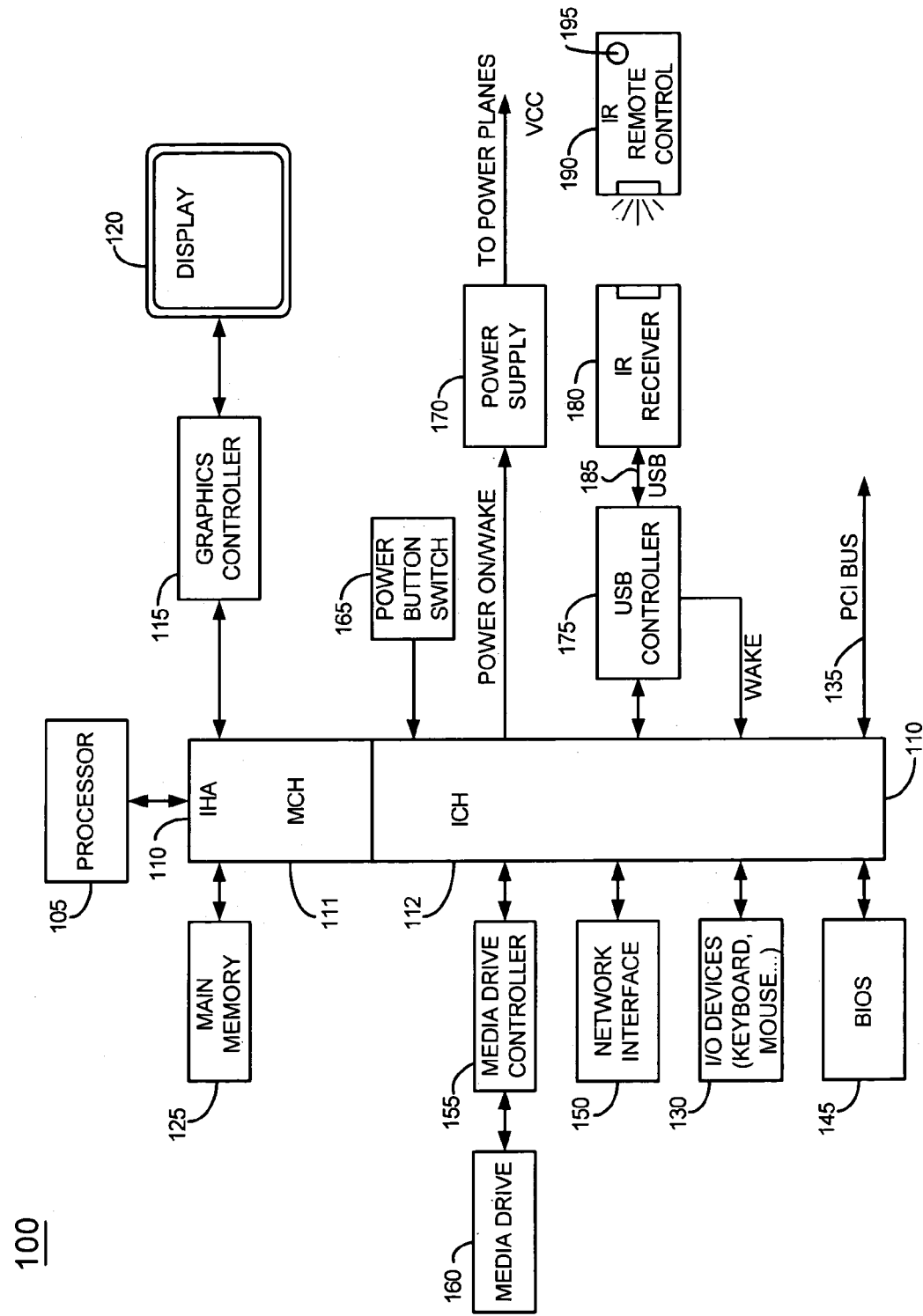
FIG. 1 is a block diagram illustrating an embodiment of the disclosed information handling system (IHS).

FIG. 1 is a block diagram of the disclosed information handling system (IHS) 100. For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In one embodiment, IHS 100 includes a processor 105 such as an Intel Pentium series processor or one of many other processors currently available. An Intel Hub Architecture (IHA) chipset 110 provides IHS 100 with glue-logic that connects processor 105 to other components of IHS 100. Chipset 110 carries out graphics/memory controller hub functions in its memory controller hub or MCH 111. Chipset 110 carries out I/O controller functions in its I/O controller hub or ICH 112. More specifically, the MCH 111 of chipset 110 acts as a host controller which communicates with a graphics controller 115 coupled thereto. Graphics controller 115 is coupled to a display 120. The MCH of chipset 110 also acts as a controller for main memory 125 which is coupled thereto.

Input devices 130 such as a mouse, keyboard, and tablet, are coupled to the ICH of chipset 110. An expansion bus 135, such as a Peripheral Component Interconnect (PCI) bus, PCI Express bus, SATA bus or other bus is coupled to chipset 110 as shown to enable IHS 100 to be connected to other devices which provide IHS 100 with additional functionality. System basic input-output system (BIOS) 145 is coupled to chipset 110 as shown. A nonvolatile memory such as CMOS or FLASH memory is used to store BIOS software 145. A network interface controller (NIC) 150 is coupled to ICH of chipset 110 to facilitate connection of system 100 to other information handling systems. A media drive controller 155 is coupled to the ICH of chipset 110 so that devices such as media drive 160 can be connected to chipset 110 and processor 105. Devices that can be coupled to media drive controller 155 include CD-ROM drives, DVD drives, hard disk drives and other fixed or removable media drives. IHS 100 includes an operating system which is stored on media drive 160. Typical operating systems which can be stored on media drive 160 include Microsoft Windows XP, Microsoft Windows 2000 and the Linux operating systems. (Microsoft and Windows are trademarks of Microsoft Corporation.)

IHS 100 includes a main power button switch 165 coupled to chipset 110. When main power button switch 165 is pressed, chipset 110 generates a power on/wake signal which is supplied to a power supply 170 which is coupled to chipset 110. Power supply 170 includes an output VCC which is coupled to the power planes of IHS 100 as discussed in more detail later. When power button 165 is pressed the power on/wake signal instructs power supply 170 to turn on and supply voltage VCC. In actual practice, power supply 170 generates a number of different voltages which are collectively referenced as VCC.

A peripheral device controller 175, such as universal serial bus (USB) controller, is coupled to the ICH of chipset 110 as shown. An infrared (IR) receiver 180 is coupled to USB controller 175 by universal serial bus 185. IHS 100 includes an IR remote control 190 which send commands via IR light to IR receiver 180. The commands which IR remote control 190 transmits include audio volume, forward, back, up, down, play, pause, and mute, for example. IR remote control 190 includes a power on/off button 195 which when pressed causes IHS 100 to turn on, or alternatively, if IHS 100 is already on, causes IHS 100 to enter a reduced power or suspend mode. USB controller 175 includes a wake output for transmitting a wake signal back to the ICH of chipset 110 as shown. While in the particular embodiment discussed above IR light is used to communicate between remote control 190 and receiver 180, radio frequency (RF) signals and acoustic (ultrasonic) signals could be used instead if desired.

IHS 100 is designed to have BIOS power behavior which solves the wake up problem described earlier where the remote user presses the power button on the remote control when power is restored to the system after being lost while the IHS is in a reduced power or suspend mode. The IHS will now again commence operation after restoration of power. However, instead of fully booting the operating system, the IHS enters a minimal power on self test (POST) mode. In this minimal POST mode, a minimal number of devices are activated, namely the devices needed to load a BIOS peripheral bus driver, for example, the USB driver in this case. Once the minimal POST mode is entered, the IHS waits for the user to press IR remote power button 195 or main power button switch 165. To the user, it appears that IHS 100 is off because display 120, media drives 180 and other devices are not operating.

Once the user presses IR remote power on button 195, BIOS resets and does a normal boot of the system. It is preferred that BIOS also set a flag to inform the operating system to load a multi-media program such as Dell Media Experience immediately after the boot. (Dell Media Experience is a trademark of Dell Inc.) This program enhances the user's ability to interact with the IHS via remote control 190. The multi-media program displays large fonts on display 120 to make it easier for the user to see content on the display from a distance. If the user presses main power button 165 instead of IR remote power button 195, the IHS boots normally. By a normal boot it is meant that the IHS boots in the same manner as when the user presses the main power button as it does conventionally. In other words, the minimal POST mode is not entered.

Figure 2:
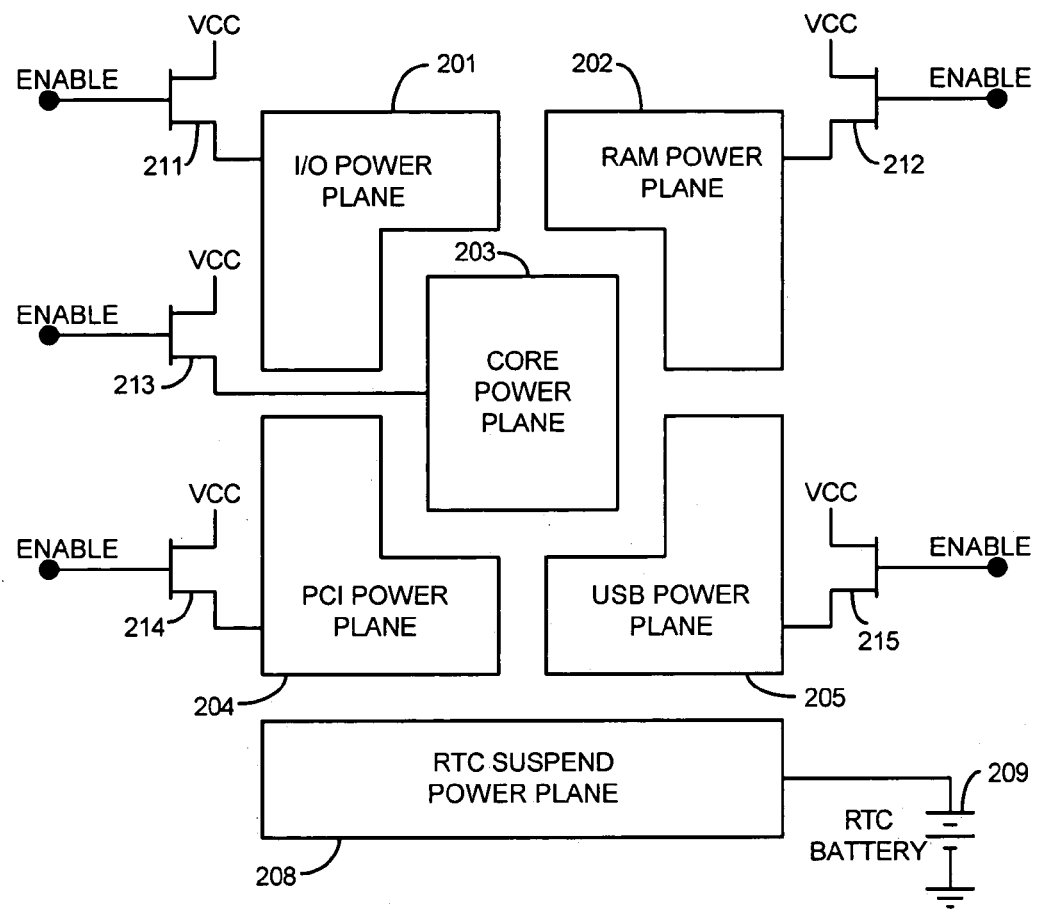
FIG. 2 is a representation illustrating an embodiment of the power planes of the disclosed IHS.

FIG. 2 is a diagram representing the power planes of IHS 100. IHS 100 includes an I/O power plane 201, a RAM power plane 202, a core power plane 203, a PCI power plane 204, a USB power plane 205 and real time clock (RTC) power plane 208. RTC power plane 208 is connected to an RTC battery 209 such that RTC power plane 208 always has power even when IHS 100 is turned off or is otherwise without power. Power planes 201, 202, 203, 204 and 205 are coupled to respective voltages VCC through respective switching FETs 211, 212, 213, 214 and 215. Each of switching FETs 211, 212, 213, 214 and 215 is supplied with a respective ENABLE signal so that power planes 201–205 can be individually turned on and off. In other words, one switching plane, such as USB power plane 205 for example, can be turned on without turning on the other power planes. The voltages VCC supplied to the respective power plans 201–205 can be different voltages.

Figure 3:
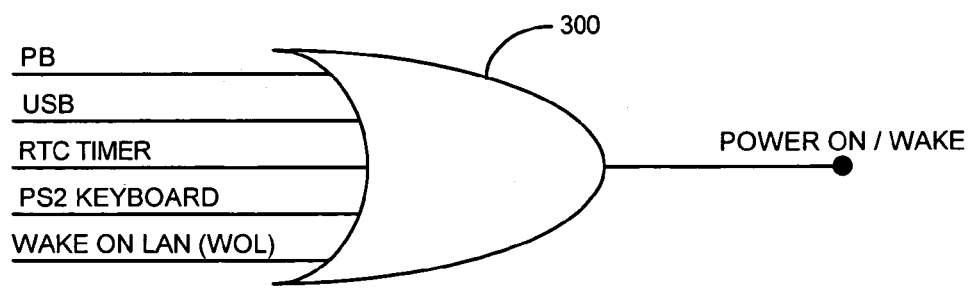
FIG. 3 is a diagram illustrating an embodiment of an OR gate used to generate a power on/wake signal for the IHS.

FIG. 3 is a diagram of logic internal to the ICH of chipset 110 which generates a power on/wake signal to instruct power supply 170 to turn on and supply power to the power planes. The logic of FIG. 3 includes a multi-input OR gate 300 to which the following signals are provided to respective inputs: a main power button switch signal PB, a USB signal, an RTC timer signal, a PS/2 keyboard signal and a wake on LAN (WOL) signal. When any one of these signals go high indicating activity then the power on/wake signal goes high to instruct power supply 170 to turn on the power planes. FIG. 3 is represents the general operation of part of the ICH of chipset 110. In actual practice however power supply 170 can be instructed to turn on each of the power planes individually.

More detail is now provided with respect to the minimal POST mode that IHS 100 enters when the system is in a reduced power mode and then mains power is lost or the User turns off the IHS using main power button switch 165. In one embodiment, the minimal POST mode keeps just enough circuitry in IHS 100 alive and powered up so that the system will respond to a power on command from remote control 190 when the user presses remote power button 195. For example, in one version of the minimal POST mode, the following 3 circuits are powered up: 1) IR receiver 180 is powered up so it can receive a power up or wake up command from IR remote control 190; 2) USB controller 175 is powered up by sending an ENABLE signal to USB power plane 205 as shown in FIG. 2., and 3) wake circuitry between USB controller 175 and power supply 170, i.e. the wake signal line between USB controller 175 and the ICH of chipset 110 and the portion of the ICH when generates the power on/wake signal supplied to power supply 170 as shown in FIG. 1.

Figure 4:
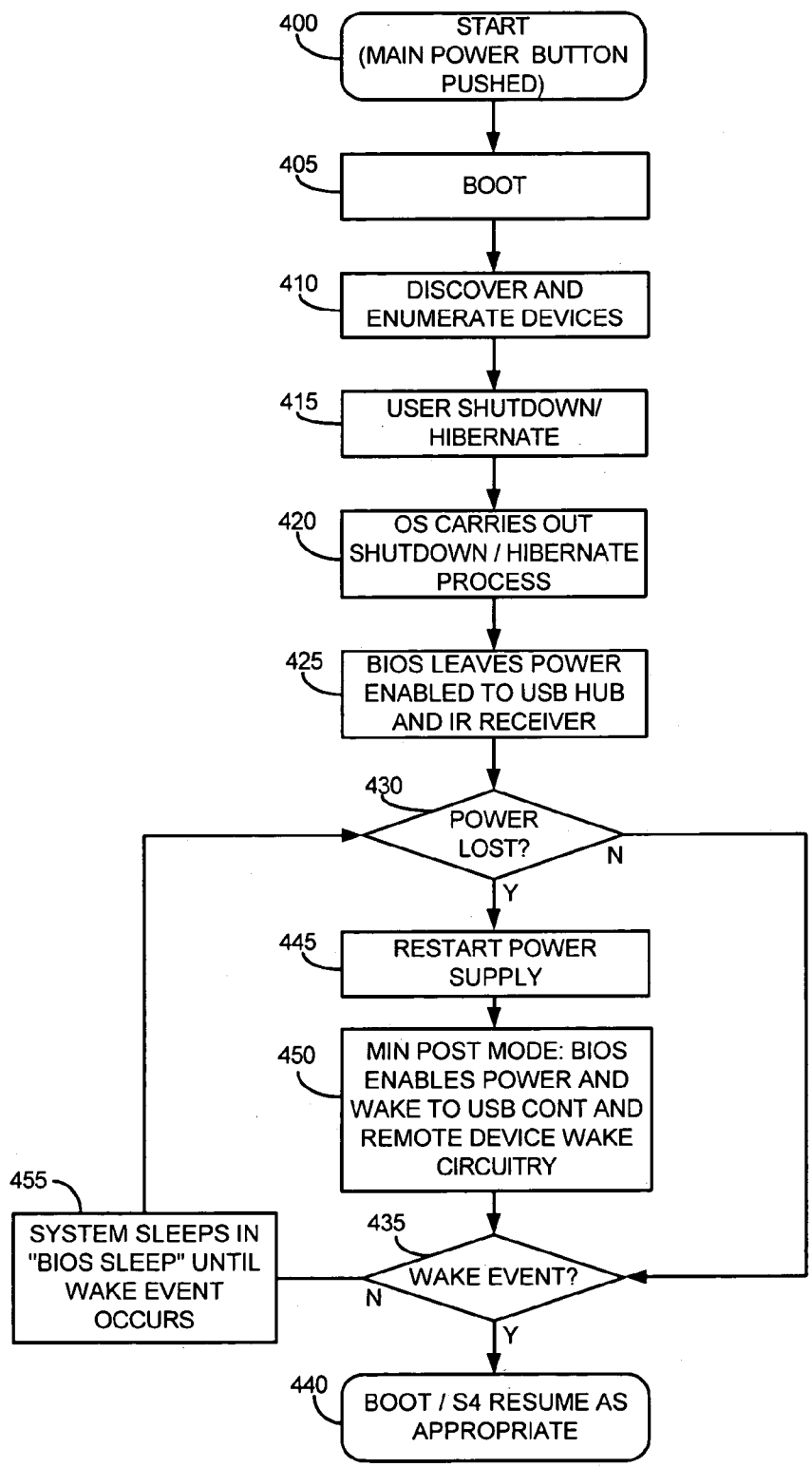
FIG. 4 is a flowchart depicting process flow in one embodiment of the disclosed IHS.

FIG. 4 is a flowchart which depicts process flow in IHS 100 showing how it recovers from a power loss when in a reduced power mode while being remotely controlled. It is noted that this power loss can occur for a number of different reasons. For example, power may fail in the AC mains which supply power to the IHS. Alternatively, the user may have turned off the main power switch of the IHS. In the flowchart of FIG. 4 it is seen that operation starts when IHS 100 is turned on and powered up by the user activating main power switch 165 as per start block 400. IHS 100 then boots and the operating system starts to load as per block 405. The operating system discovers and enumerates devices as per block 410. At this point IHS 100 is fully operational and responsive to commands from IR remote control 190. In this example the user presses remote control button 195 to instruct the IHS to enter a reduced power mode. For example, depending on the particular embodiment, the IHS may be instructed to enter an S3 reduced power or suspend mode where the system state is saved to memory or to an S4 reduced power or hibernate mode wherein the system state is saved to media drive 160. Other reduced power states are possible as well depending upon the particular application. BIOS 145 is programmed as per block 425 to leave power enabled to USB controller 175 and IR receiver 180 after the reduced power state is entered. A test is then conducted at decision block 430 to determine if power has been lost. For example, a flag value stored in volatile system memory is no longer set. If it is determined that power has not been lost then flow continues to decision block 435 where is test is conducted to determine if a wake up event has occurred. For example, has the user pressed remote control power on/suspend button 195 or has the user pressed main power switch 165. If the user pressed the power on/suspend button 195 of the remote control then the IHS resumes normal operation from the low power state in which it was operating as seen in block 440. If the user pressed main power button switch 165 then the IHS performs a reboot. However, if it was determined at decision block 430 that power was lost while IHS 100 was in the reduced power mode, then power supply 170 is restarted as per block 445. The minimal POST mode described earlier is then entered as per block 450. Decision block 435 then tests for a wake up event such as the user pressing the remote control power on/suspend button 195. If a wake up event has occurred, then the system resumes from the reduced power mode or boots as described earlier. However, if no wake event has yet occurred, then the BIOS continues operating in a BIOS sleep mode as per block 455 until a wake event occurs. More particularly, a loop continues through block 430, 445, 450 and decision block 435 until decision block 435 detects a wake event. Advantageously, by using the minimal POST mode to keep power alive to the peripheral bus to which the remote IR receiver is coupled, IHS 100 will be able to wake up when power is restored after a power loss in response to a command from remote control 190. While in the particular embodiment shown, remote control 190 send commands via an IR receiver on the USB bus, the disclosed technology can readily be applied to other peripheral busses as well.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of operating an information handling system (IHS) including a remote control and a receiver responsive to the remote control, the method comprising:
   receiving, by the receiver of the IHS, a command from the remote control instructing the IHS to turn on, and if already turned on to enter a reduced power mode, the receiver being coupled to a USB bus of the IHS;
   entering the reduced power mode, by the IHS, in response to the command; and
   upon loss of power by the IHS and return of power to the IHS, supplying power to a sufficient portion of the IHS to enable the IHS to respond to commands from the remote control.

2. The method of claim 1 wherein infrared communications are used to communicate between the remote control and the receiver.

3. The method of claim 1 wherein radio frequency communications are used to communicate between the remote control and the receiver.

4. The method of claim 1 wherein acoustic communications are used to communicate between the remote control and the receiver.

5. The method of claim 1 wherein the sufficient portion of the IHS includes the peripheral bus.

6. The method of claim 1 wherein the IHS enters a minimal power on self test (POST) mode when power is lost by the IHS and power returns to the IHS.

7. The method of claim 6 including controlling the minimal POST mode with basic input output system (BIOS) software.

8. A method of operating an information handling system (IHS) including a remote control and a receiver responsive to the remote control, the method comprising:
   coupling the receiver to a USB bus of the IHS;
   in response to a command from the remote control, the IHS being turned on, and if already turned on, the IHS entering a reduced power mode; and
   upon loss of power by the IHS and return of power to the IHS, supplying power to a sufficient portion of the IHS to enable the IHS to respond to the remote control.

9. The method of claim 8 wherein infrared communications are used to communicate between the remote control and the receiver.

10. The method of claim 8 wherein radio frequency communications are used to communicate between the remote control and the receiver.

11. The method of claim 8 wherein acoustic communications are used to communicate between the remote control and the receiver.

12. The method of claim 8 wherein the sufficient portion of the IHS includes the peripheral bus.

13. The method of claim 8 wherein the IHS enters a minimal power on self test (POST) mode when power is lost by the IHS and power returns to the IHS.

14. The method of claim 13 including controlling the minimal POST mode with basic input output system (BIOS) software.

15. An information handling system (IHS) comprising:
a processor;
a memory coupled to the processor;
glue logic, coupled to the processor, for enabling devices to be coupled to the processor;
a receiver, coupled to the glue logic, for receiving commands, the receiver being coupled to a USB bus of the IHS;
a remote control for sending commands to the receiver; and
nonvolatile storage, coupled to the glue logic, including control software for causing the IHS to turn on, and if already turned on to enter a reduced power mode in response to the receiver receiving a command from the remote control and, upon loss of power by the IHS and return of power to the IHS, instructing that power be supplied to a sufficient portion of the IHS to enable the IHS to respond to commands from the remote control.

16. The IHS of claim 15 wherein the remote control is an infrared remote control and the receiver is an infrared receiver.

17. The IHS of claim 15 wherein the remote control is a radio frequency remote control and the receiver is a radio frequency receiver.

18. The IHS of claim 15 wherein the remote control is an acoustic remote control and the receiver is an acoustic receiver.

19. The IHS of claim 15 wherein the sufficient portion of the IHS includes the peripheral bus.

20. The IHS of claim 15 wherein the IHS enters a minimal power on self test (POST) mode when power is lost by the IHS and power returns to the IHS.

21. The IHS of claim 20 wherein the control software includes basic input output system (BIOS) software which controls the minimal POST mode.

22. An information handling system (IHS) comprising:
a processor;
a receiver coupled to a USB bus of the IHS;
a memory coupled to the processor; and
nonvolatile storage, coupled to the processor, including control software for causing the IHS to turn on, and if already turned on to enter a reduced power mode in response to receiving a remote command and, upon loss of power by the IHS and return of power to the IHS, instructing that power be supplied to a sufficient portion of the IHS to enable the IHS to respond to the remote command.

23. A method of operating an information handling system (IHS) including a remote control and a receiver responsive to the remote control, the method comprising:

receiving, by the receiver of the IHS, a command from the remote control instructing the IHS to turn on, and if already turned on to enter a reduced power mode;
entering the reduced power mode, by the IHS, in response to the command;
upon loss of power by the IHS and return of power to the IHS, supplying power to a sufficient portion of the IHS to enable the IHS to respond to commands from the remote control; and
coupling the receiver to a peripheral bus of the IHS, a peripheral bus power plane coupled to the peripheral bus, and the sufficient portion of the IHS including the peripheral bus power plane.

24. A method of operating an information handling system (IHS) including a remote control and a receiver responsive to the remote control, the method comprising:
in response to a command from the remote control, the IHS being turned on, and if already turned on, the IHS entering a reduced power mode;
upon loss of power by the IHS and return of power to the IHS, supplying power to a sufficient portion of the IHS to enable the IHS to respond to the remote control; and
coupling the receiver to a peripheral bus of the IHS, a peripheral bus power plane coupled to the peripheral bus, and the sufficient portion of the IHS including the peripheral bus power plane.

25. An information handling system (IHS) comprising;
a processor;
a memory coupled to the processor;
glue logic, coupled to the processor, for enabling devices to be coupled to the processor;
a receiver, coupled to the glue logic, for receiving commands
a remote control for sending commands to the receiver;
nonvolatile storage, coupled to the glue logic, including control software for causing the IHS to turn on, and if already turned on to enter a reduced power mode in response to the receiver receiving a command from the remote control and, upon loss of power by the IHS and return of power to the IHS, instructing that power be supplied to a sufficient portion of the IHS to enable the IHS to respond to commands from the remote control; and
the receiver coupled to a peripheral bus of the IHS, a peripheral bus power plane coupled to the peripheral bus, and the sufficient portion of the IHS including the peripheral bus power plane.

26. An information handling system (IHS) comprising:
a processor;
a memory coupled to the processor;
nonvolatile storage, coupled to the processor, including control software for causing the IHS to turn on, and if already turned on to enter a reduced power mode in response to receiving a remote command and, upon loss of power by the IHS and return of power to the IHS, instructing that power be supplied to a sufficient portion of the IHS to enable the IHS to respond to the remote command; and
the receiver coupled to a peripheral bus of the IHS, a peripheral bus power plane coupled to the peripheral bus, and the sufficient portion of the IHS including the peripheral bus power plane.

* * * * *